(12) United States Patent
Novikov et al.

(10) Patent No.: US 11,443,414 B2
(45) Date of Patent: Sep. 13, 2022

(54) IMAGE SIGNAL PROCESSING

(71) Applicant: Apical Limited, Cambridge (GB)

(72) Inventors: Maxim Novikov, Manchester (GB);
James Stuart Imber, St Albans (GB);
Yury Khrustalev, Loughborough (GB);
David Hanwell, Stapleford (GB)

(73) Assignee: Arm Limited, Cambridge (GB)

( * ) Notice: Subject to any disclaimer, the term of this patent is extended or adjusted under 35 U.S.C. 154(b) by 99 days.

(21) Appl. No.: 17/075,299

(22) Filed: Oct. 20, 2020

(65) Prior Publication Data

US 2021/0125324 A1 Apr. 29, 2021

(30) Foreign Application Priority Data

Oct. 23, 2019 (GB) ...................................... 1915380

(51) Int. Cl.
*G06T 7/00* (2017.01)
*G06K 9/62* (2022.01)
*G06N 3/08* (2006.01)

(52) U.S. Cl.
CPC .......... *G06T 7/0002* (2013.01); *G06K 9/6262* (2013.01); *G06K 9/6267* (2013.01); *G06N 3/08* (2013.01); *G06T 7/97* (2017.01); *G06T 2207/20084* (2013.01); *G06T 2207/30168* (2013.01)

(58) Field of Classification Search
CPC ..................... G06T 7/0002; G06T 7/97; G06T 2207/20084; G06T 2207/30168; G06T 1/00; G06K 9/6262; G06K 9/6267; G06K 9/62; G06N 3/08; G06N 7/005; G06N 5/04; G06V 10/993; H04N 1/6033; H04N 1/60; H04N 5/2173; H04N 17/002
See application file for complete search history.

(56) References Cited

U.S. PATENT DOCUMENTS

| | | | |
|---|---|---|---|
| 2007/0216958 A1* | 9/2007 | Narukawa | H04N 1/0035 358/302 |
| 2017/0061045 A1* | 3/2017 | Okuyama | G01R 31/2848 |
| 2017/0070671 A1* | 3/2017 | Cho | H04N 5/23229 |
| 2019/0043209 A1 | 2/2019 | Nishimura et al. | |
| 2019/0045160 A1* | 2/2019 | El-Yamany | G06T 7/90 |
| 2019/0050682 A1 | 2/2019 | Sutic et al. | |
| 2019/0197731 A1* | 6/2019 | Potnis | H04N 7/183 |
| 2020/0126190 A1* | 4/2020 | Lebel | G06V 10/454 |
| 2021/0160470 A1* | 5/2021 | Afifi | H04N 9/73 |
| 2021/0192687 A1* | 6/2021 | Liu | G06N 3/084 |
| 2021/0227126 A1* | 7/2021 | Se | H04N 5/23218 |

(Continued)

OTHER PUBLICATIONS

United Kingdom Combined Search and Examination Report dated Aug. 6, 2020 for GB Application No. 1915380.8.

(Continued)

*Primary Examiner* — Xuemei G Chen
(74) *Attorney, Agent, or Firm* — EIP US LLP (57) ABSTRACT

A method of optimising an image signal processor (ISP), which is to be used to process sensor image data generating output image data. The method may include obtaining sensor image data; processing the sensor image data according to one or more ISP settings to produce output image data; producing quality metric data associated with the output image data and optimising the one or more ISP settings based on the quality metric data.

16 Claims, 7 Drawing Sheets

(56) References Cited

U.S. PATENT DOCUMENTS

2021/0390671 A1* 12/2021 Moon .................. G06T 5/50
2022/0036523 A1* 2/2022 Moran ................. G06T 5/002

OTHER PUBLICATIONS

Tan et al., "Color Image Demosaicking via Deep Residual Learning", IEEE International Conference on Multimedia and Expo (ICME), Jan. 1, 2017.

Tian et al. "Automating the design of image processing pipelines for novel color filter arrays: Local, Linear, Learned (L3) method", IS&T/SPIE Electronic Imaging, Feb. 1, 2014.

Zhang et al., "Beyond a Gaussian Denoiser: Residual Learning of Deep CNN for Image Denoising", IEEE Transactions on Image Processing, Feb. 1, 2017.

* cited by examiner

IMAGE SIGNAL PROCESSING

CROSS-REFERENCE TO RELATED APPLICATIONS

This application claims the benefit under 35 U.S.C. § 119(a) and 37 CFR § 1.55 to United Kingdom patent application no. GB1915380.8 filed on Oct. 23, 2019, the entire content of which is incorporated herein by reference.

BACKGROUND OF THE INVENTION

Field of the Invention

The present disclosure relates to methods, apparatus and computer software for optimising an image signal processor (ISP) and to methods, apparatus and computer software for optimising a simulator. The disclosure has particular, but not exclusive, relevance to the processing of image data in a computer vision image processing system.

Description of the Related Technology

Image processing systems are used to process sensor image data using computer algorithms. These algorithms change the quality of an image so that it is suitable for viewing by a human or computer vision (CV) algorithm, where the image can be analysed to extract information. An image processing system typically takes image data from a sensor. The sensor captures a scene to generate sensor image data. The sensor image data results from the detection of photons from the scene by the sensor. The sensor image data is then processed by an image signal processor (ISP) to recover image data which matches the original scene.

An ISP may be optimised manually using ground truth images, images which are considered to have ideal qualities for optimising the settings of the ISP. However, ground truth images are difficult to obtain as the sensor image data produced by the capture process is largely dependent upon the properties of the sensor being used. The typical manual optimisation process results in an ISP which works with only one sensor, limiting the image processing system. The process of manually optimising the ISP is largely subjective, time consuming and requires expert knowledge.

CV systems are usually designed or trained to work on human-viewable, processed images, so sensor image data also requires processing by an ISP for such applications. Optimising CV accuracy is difficult to do manually as it is hard to determine which settings of the ISP have the largest influence on the CV algorithm. For commercial applications, CV algorithms are usually trained to work with data produced by a specific sensor. In research, CV algorithms can be trained using large, shared databases of annotated data originating from many different sensors and processing pipelines. The information produced by the same CV algorithm for two CV systems with different sensors, may be different, which is not ideal for many applications.

SUMMARY

According to a first aspect of the present disclosure, there is provided a method of optimising an image signal processor (ISP), which is to be used to process sensor image data generating output image data, the method comprising:
  obtaining sensor image data;
  processing the sensor image data according to one or more ISP settings to produce output image data;
  producing quality metric data associated with the output image data; and
  optimising the one or more ISP settings based on the quality metric data.

According to a second aspect of the present disclosure, there is provided a method of optimising a simulator, which is to be used to process test image data to generate simulated sensor image data, the method comprising:
  receiving test image data consistent with a scene;
  processing the test image data according to one or more simulator settings to produce simulated sensor image data;
  capturing the scene using a sensor to produce sensor image data;
  performing a comparison between the simulated sensor image data and sensor image data;
  producing quality metric data associated with the comparison; and
  optimising one or more simulator settings based on the quality metric data.

Further aspects of the present disclosure are set out in the appended claims.

Features and advantages will become apparent from the following description of preferred embodiments, given by way of example only, which is made with reference to the accompanying drawings.

DETAILED DESCRIPTION OF CERTAIN INVENTIVE EMBODIMENTS

Details of systems and methods according to examples will become apparent from the following description with reference to the figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain features omitted and/or necessarily simplified for the ease of explanation and understanding of the concepts underlying the examples.

Figure 1:
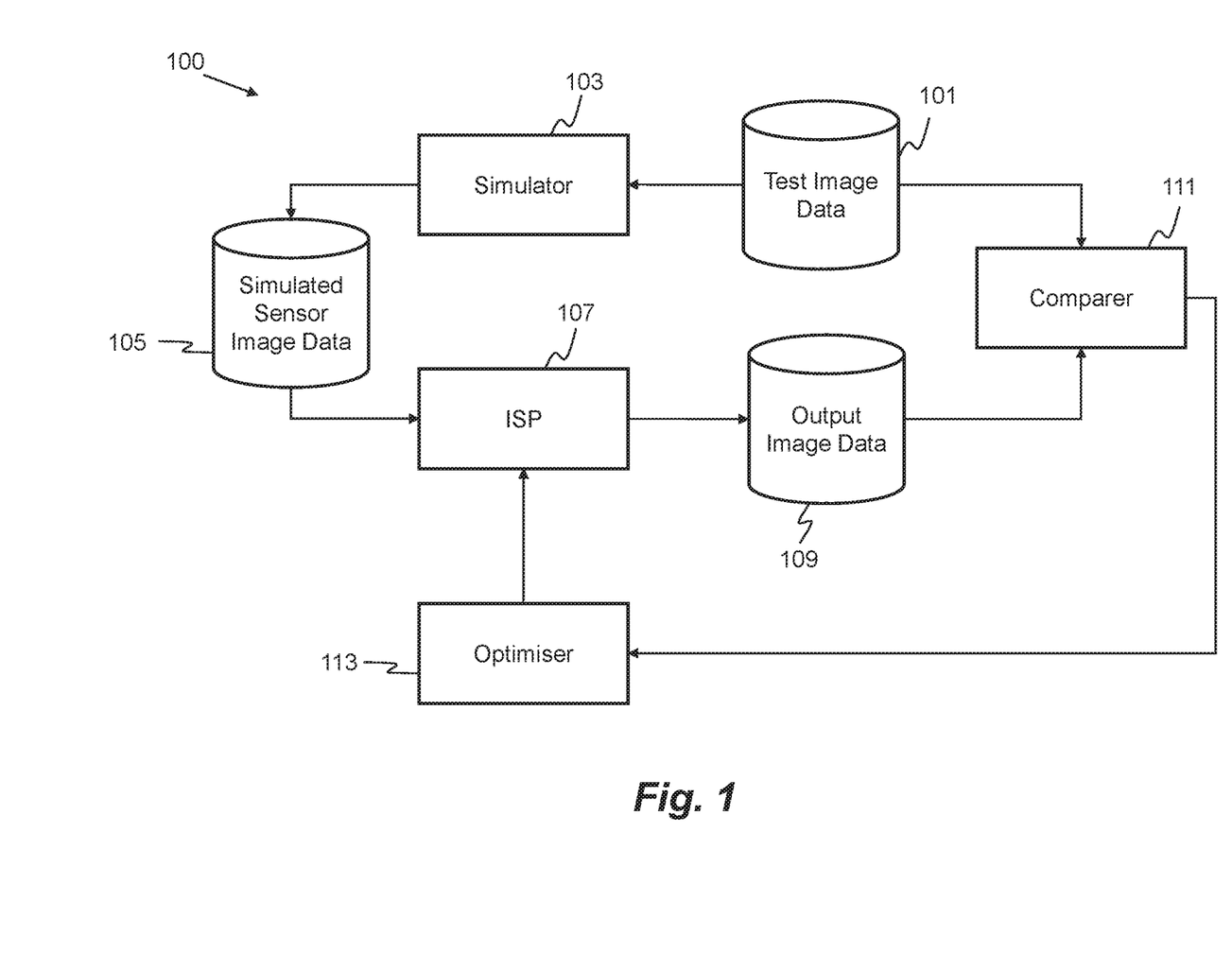
FIG. 1 shows a schematic block diagram demonstrating an image processing system arranged in accordance with a first example of the present disclosure.

FIG. 1 shows a schematic block diagram of an image processing system 100 where an optimiser 113 is used to optimise settings of an image signal processor (ISP) 107 which uses simulated sensor image data 105 to generate output image data 109 which is compared with test image data 101, consistent with a first example of the present disclosure. In one example, the optimiser 113 may be a software or hardware module implementing an automatic optimisation algorithm for the ISP 107.

Test image data 101 is input into the image processing system 100. The test image data 101, simulated sensor image data 105 and output image data 109 may be kept in memory circuitry such as dynamic random-access memory (DRAM) or static random-access memory (SRAM). The test image data 101 may be image data which is optimised for human and computer vision (CV) applications. The test image data 101 may contain a matrix of assigned values, where the values represent a pixel's colour or intensity. The test image data 101 may have been generated by an ISP with one or more optimised sub-modules. The test image data 101 may contain a scene which may include but is not limited to a landscape, object or animal. It is not necessary for the test image data 101 to be of a physical scene taken by a camera, instead it may be a scene generated by a computer program. The test image data 101 may have undergone a process to boost its dynamic range to bit depths with a realistic distribution of image intensities to produce a high dynamic range (HDR) image through the use of a rendering engine.

The type of test image data 101 which is input into the image processing system may be dependent upon the ISP sub-modules that are being optimised. For example, the test image data 101 may be a task specific or multifeatured test chart which is specifically designed to optimise certain ISP settings. The image processing system may be focused on optimising the settings of the ISP associated with sharpness. In this case, test charts which are used to optimise sharpness may be used as the test image data 101. In another example, a plurality of test charts each optimising a different ISP sub-module may form a training set for the optimisation of the ISP 107.

Figure 2:
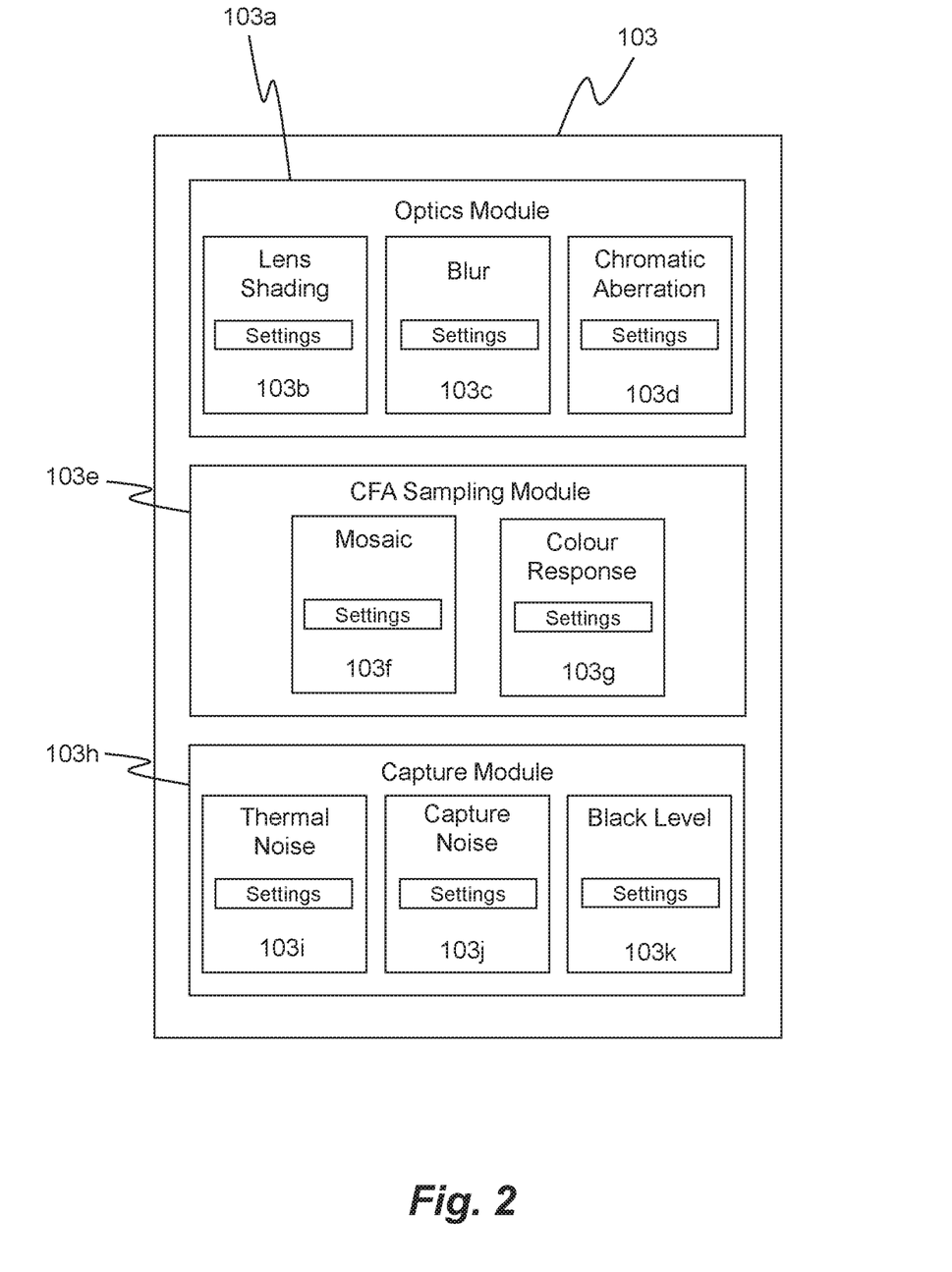
FIG. 2 shows a schematic block diagram for a simulator in accordance with the present disclosure.

The test image data 101 is then input into a simulator 103. The simulator 103 may be a software or hardware module implementing a simulation model of a capture device such as a sensor. FIG. 2 is a schematic block diagram for simulator 103. The simulator 103 simulates a physical capture process of a scene by a sensor, producing simulated sensor image data 105. Examples of a simulated sensor include a simulated digital camera. In the physical capture process which the simulator 103 simulates, sensor image data is generated from the detected intensity of light at various sensor pixels or points on the sensor. The simulator 103 generates simulated sensor image data 105 consistent with this physical process. The simulated sensor image data 105 may consist of a matrix of values, with each value representing the simulated intensity of light of a pixel. The simulated sensor image data 105 produced is dependent upon the properties of the simulated sensor. In one example, the simulated sensor has a colour filter array (CFA) which in the physical capture process being simulated, is used to detect the colour of the light coming from the scene. The colour filter may be, but is not limited to a Bayer filter, which is composed of a combination of 2×2 pixel arrays of red, green, green and blue filters. The use of the colour filter array produces simulated sensor image data 105 which is mosaicked as in the physical capture process which is being simulated, each colour pixel can only detect light of a certain colour. In another example, the simulated sensor image data 105 contains simulated signal noises which in the simulated physical capture process would result from various stochastic physical processes and brightness levels in the scene. If a human or CV algorithm were to view the simulated sensor image data, little information would be able to be retrieved.

The simulator 103 uses settings consistent with a simulated sensor to generate simulated sensor image data 105. In one example the simulator 103 contains modules such as an optics module 103a, a CFA sampling module 103e and a capture module 103i. The optics module 103a may contain one or more sub-modules such as lens shading sub-module 103b, blur sub-module 103c and chromatic aberration sub-module 103d. The CFA sampling module 103e may contain one or more sub-modules such as a mosaic sub-module 103f and a colour response sub-module 103g. The capture module 103h may contain one or more sub-modules consistent with the simulated sensor capturing a scene such as a thermal noise sub-module 103i, a capture noise sub-module 103j and a black level sub-module 103k. The simulator 103 may have settings which can be used to simulate the effects of setting integration time, gain values and other control registers of the simulated sensor which may affect the amount of noise, blur and other qualities contained within the simulated sensor image data 105. A setting for the mosaic sub-module 103f may be representative of one or more properties of a simulated sensor with a Bayer filter. A setting for the black level sub-module 103k may be representative of how a simulated sensor allows for pixel values in dark regions of the image to vary in value in an effort to recover information. Settings for the colour response sub-module 103g may be representative of how the simulated sensor properties can result in the different colour filters having varying sensitivities. An intensity leakage between different colour channels may also be represented by the settings of the simulator 103.

The simulator settings may be selected to match the properties of a characterised sensor. The settings for a simulator sub-module may be used to produce a set of operations associated with it, which are performed on the pixel values of the test image data 101. The settings may also be used to produce one or more kernels associated with one or more of the sub-modules of the simulator 103. A kernel may be implemented as a matrix of values for convolution operations to be performed in the simulator 103. The test image data 101 may be convolved with a sub-module kernel. In one example, the mosaic sub-module 103f settings are used to produce a set of operations which when applied to the test image data 101 result in image data which is spatially multiplexed or mosaicked, simulating the effect of a sensor with a series of repeating patterns of colour pixels having produced the data. In another example, all sub-module operations are applied to the test image data 101, one after the other, with the result from each set of operations being used as the input for the next in order to produce the simulated sensor image data. The simulator 103 settings may be chosen such that one or more of the sub-modules or modules may be turned off, producing simulated sensor image data 105 which is unchanged in certain respects, allowing the ISP to focus on optimising certain ISP sub-modules or modules.

Figure 3:
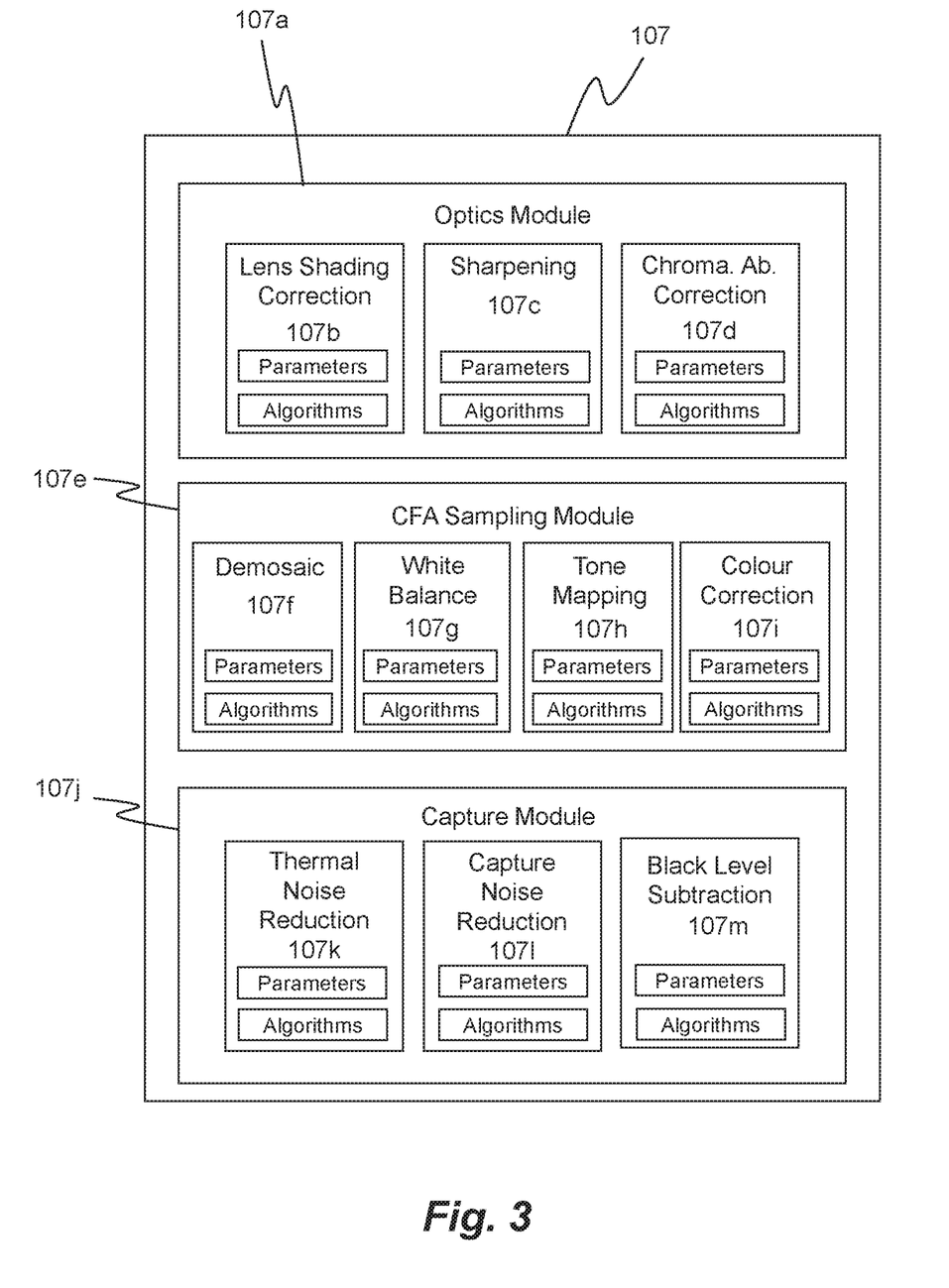
FIG. 3 shows a schematic block diagram for an ISP in accordance with the present disclosure.

The simulated sensor image data 105 is then input into an ISP 107. The ISP 107 may be physical hardware consisting of configurable logic blocks or it may be computer software based. FIG. 3 is a schematic block diagram for an ISP 107 which can be used to process simulated sensor image data 105 to produce output image data 109. The output image data 109, unlike the simulated sensor image data 105, is ideally image data that may be viewed by a human or CV algorithm to gather information about a scene contained in the output image data 109. In one example, the output image data contains a scene of a vehicle with a number plate which may need to be identified. The ISP 107 may be configured to remove the changes made to the simulated sensor image data 105 by the simulator 103 to recover the test image data 101. In doing so, the ISP 107 settings are optimised to process sensor image data resulting from physical capture processes for human or CV applications.

The ISP 107 may contain a number of modules such as an optics module 107*a*, a CFA sampling module 107*e* and a capture module 107*j*. Each of these modules may contain sub-modules. The optics module 107*a* of the ISP 107 may contain one or more sub-modules which are used to remove changes made to the simulated sensor image data 105 by the optical settings of the simulator 103 such as a lens shading correction sub-module 107*b*, a sharpening sub-module 107*c* and a chromatic aberration correction sub-module 107*d*. The CFA sampling module 107*e* may contain one or more sub-modules which are used to remove changes made to the simulated sensor image data 105 by the colour filter array settings of the simulator 103 such as a demosaic sub-module 107*f*, a white balance sub-module 107*g*, a tone mapping sub-module 107*h* and a colour correction sub-module 107*i*. The capture module 107*j* may contain one or more sub-modules which are used to remove changes made to the simulated sensor image data 105 by the capture settings of the simulator 103 such as a thermal noise reduction sub-module 107*k*, a capture noise reduction sub-module 107*l* and a black level subtraction sub-module 107*m*. In one example, the demosaic sub-module 107*f* converts multiplexed colour values contained within sensor image data, which occurs due to the use of a CFA, to dense colour values. In another example, the thermal noise reduction sub-module 107*k* and capture noise reduction sub-module 107*l* are used to remove noise from sensor image data by attempting to reconstruct the original signal. In a further example, the sharpening sub-module 107*c* is used to invert the point spread function (PSF) or blurring effects contained within sensor image data. In another example, the colour correction sub-module 107*i* is used to correct intensity leakage between colour channels. In a final example, the tone mapping sub-module 107*h* is used to reduce the dynamic range of the sensor image data whilst preserving local contrast.

The ISP sub-modules may have settings which are representative of selections of one or more parameter values and/or selections of one or more algorithms. In one example a plurality of algorithms exist for one or more of the ISP sub-modules where one or multiple algorithms may be selected from the plurality. The selected parameter values and algorithms may be used to generate a set of operations associated with each sub-module. The selected parameter values and algorithms may be used to generate one or more kernels associated with each ISP sub-module. A kernel may be a matrix of values. The simulated sensor image data 105 may be convolved with one or more kernels associated with an ISP sub-module. In one example, the demosaic sub-module 107*f* operations when applied to the simulated sensor image data 105 result in image data with no spatial multiplexing. In another example, all ISP sub-module operations are applied to the simulated sensor image data 101, one after the other. The result from each set of operations may be used as the input for the next to produce the output image data 109. The settings of the ISP sub-modules may be chosen as such that some modules or sub-modules are turned off so that the settings of certain modules or sub-modules of the ISP 107 may be optimised.

It should be noted that some of the ISP sub-modules may be the inverse of corresponding sub-modules of the simulator 103. In one example, the colour correction 107*i*, white balance 107*g* and black level subtraction 107*m* sub-modules of the ISP 107 are the inverse of the colour response 103*g* and black level 103*k* sub-modules of the simulator 103. It should also be noted however, that the ISP settings may be different to the simulator settings in that they may also contain algorithms associated with each sub-module and may be implemented differently to the sub-modules and settings of the simulator 103. The ISP settings may be related to the simulator settings but, this relationship is non-trivial and is dependent upon the algorithm selected for the ISP sub-modules and the implementation. Creating mathematical models for the inversion of simulator settings to select the ISP settings is computationally taxing and often impossible. For this reason, the settings of the ISP 107 must be optimised rather than calculated from the known simulator settings.

The generated output image data 109 from the ISP 107 may be used to produce quality metric data. Quality metric data may consist of a single quality metric value or a plurality of quality metric values. In one example quality metric data is obtained directly from the output image data 109. The quality metric data may be based on the output image data's 109 spatial frequency response or modulation transfer function metric which may be calculated by the image processing system. In another example, the output image data 109 is compared to the test image data 101 using a comparer 111 which produces quality metric data. The comparer 111 may be software or hardware module implementing a mathematical comparison function. In one example, a cost function is utilised as the comparer 111 to compare the output image data 109 and test image data 101, assigning the quality metric of the cost, which indicates how close the output image data 109 is to the test image data 101. In another example the cost function is an L1 distance function. In a further example, the comparer 111 is selected such that it has the greatest sensitivity to the ISP 107 settings which are currently being optimised by the image processing system 100. In a final example, the comparer 111 is made up of a combination of functions which produce a number of quality metric values associated with the comparison which are used to calculate a single quality metric value. Ideally, the ISP 107 will have removed all the changes produced by the simulator 103 resulting in output image data 109 which has 1:1 correspondence with the test image data 101. It is likely that the first time the ISP 107 processes the simulated sensor image data 105 there will be a significant difference between the test image data 101 and output image data 109.

In one example, a training set of test image data 101 is implemented, where each piece of test image data 101 is passed through the image processing system producing an associated quality metric value which is then stored in memory circuitry. Once all the test image data 101 has been processed to produce an associated quality metric value, the stored quality metric values are used to form quality metric data. In one example, the quality metric data produced is input into an optimiser 113. The optimiser 113 then uses the quality metric data to select or configure the algorithms and parameter values of the ISP 107 sub-modules. In one example the comparer 111 is a cost function which produces a cost which is used by the optimiser 113. The optimiser 113 may contain a single optimisation algorithm or a plurality of optimisation algorithms which may be used to make changes to the ISP 107 settings based on the quality metric data.

Figure 4:
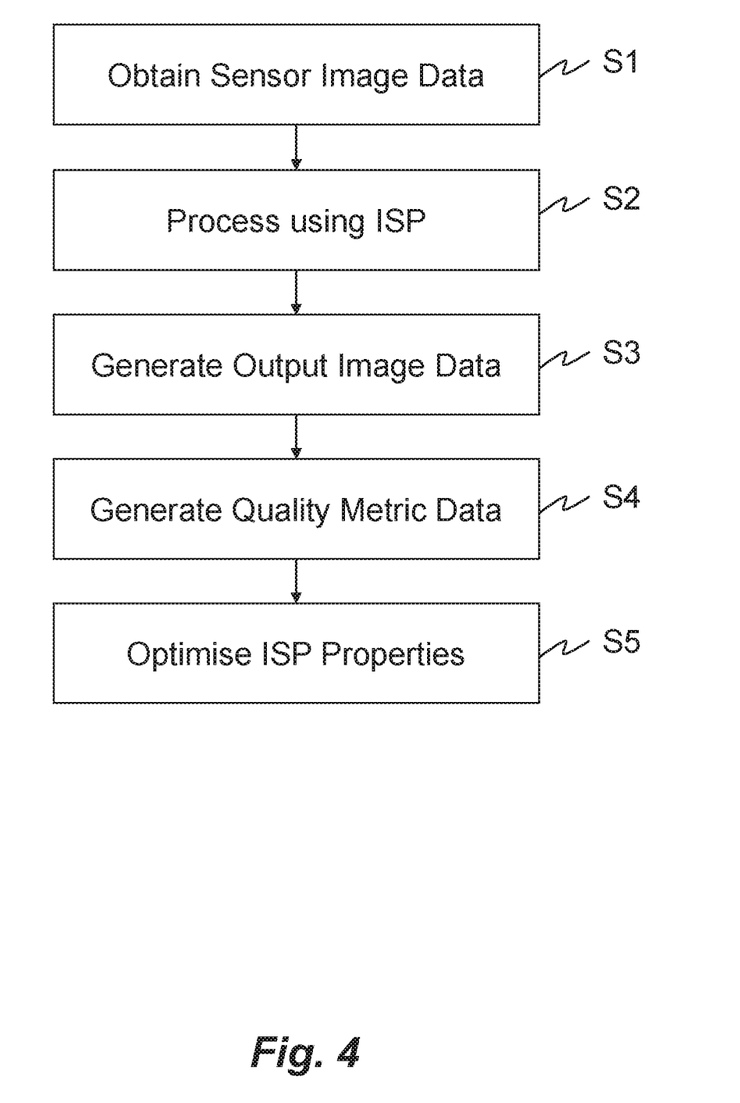
FIG. 4 shows a series of procedures carried out by the image processing system shown in FIG. 1.

FIG. 4 demonstrates a series of procedures carried out by the image processing system 100 shown in FIG. 1. The first procedure S1 of the image processing system 100 is obtaining sensor image data 105. This is then processed in procedure S2 by the ISP 107. The resulting output image data 109 generated by the ISP in step S3. A procedure S4 is carried out to generate quality metric data; the output data 109 may be compared to the test image data 101 using a comparer 111 and/or the quality metric data may be calculated directly from the output image data 109. Where the output data 109 is compared to test image data 101 using a comparer 111, this step may be repeated with different test image data 101 to produce a plurality of quality metric values one or more of which may which form the quality metric data. The quality metric data is then used by an optimiser 113 to optimise the settings of the ISP 107.

The ISP 107, comparer 111 and optimiser 113 may be arranged in a closed feedback loop. A cycle of the closed feedback loop may include processing the simulated sensor image data 105 with the ISP 107 to generate the output image data 109 which is then compared to test image data 101 using the comparer 111. In one example, these steps are repeated a number of times with different test image data 101 to produce a plurality of quality metric values which form quality metric data or the steps are carried out only once with one piece of test image data 101 to produce one quality metric value. The quality metric data is then used to update the ISP settings using the optimiser 113. In another example, the ISP 107 and optimiser 113 are arranged in a closed feedback loop, where quality metric data is calculated from the output image data 109. At the end of one cycle of the feedback loop, the quality metric data is then input into the optimiser 113 to update the ISP settings. The next cycle of the feedback loop begins when the updated ISP 107 is used to process simulated sensor image data 105 once again producing output image data 109 where quality metric data is calculated or is obtained by being compared to test image data 101. If the quality metric data indicates that the changes to the image data during the current cycle are detrimental to the optimisation process, that information can be used by the optimiser 113 to inform how the ISP settings will be changed for the next cycle. The feedback loop cycles continue until the test image data 101 and output image data 109 produce quality metric data that indicates that the two sets of image data are suitably close or the calculated quality metric data indicates that the output image data 109 is of a suitable quality. In one example the calculated quality metric data must be below a predetermined threshold value for the feedback loop to be interrupted and the optimisation process to be terminated. In another example, the comparer 111 implements a cost function producing quality metric data consisting of cost values. When the cost values reach a predetermined threshold value, the feedback loop is interrupted, and the optimisation process terminated. In a further example, if the quality metric data indicates that certain ISP sub-modules are optimised to a prescribed threshold, the further optimisation of those sub-modules are prevented. Using this feedback loop process, the settings of the ISP 107 are optimised to remove the changes made to the simulated sensor image data 105 by the simulator 103, recovering output image data 109 substantially matching that of the test image data 101 or that is of a sufficient quality. In doing so, the ISP settings are optimised to process sensor image data retrieved from a physical capture process so that it can be used for human and CV applications. It should be noted that both quality metric data calculated from the output image data 109 and quality metric data from the comparison of the test image data 101 and output image data 109 may be combined and used by the optimiser 113 to change the ISP settings.

For each cycle of the feedback loop to produce quality metric data which converges to a value or values indicating the ISP settings are being optimised, an optimisation algorithm needs to be carefully selected. The optimisation algorithm may be used to choose the order the settings of the ISP 107 are optimised in, as well as how they are optimised. The ISP parameter values may be fixed-point numbers with limited precision. To fully optimise the ISP 107 can take hundreds or thousands of cycles of the feedback loop where the amount of time it takes for the ISP 107 to process the simulated sensor image data 105 limits the speed of the optimisation process.

In one example the optimisation algorithm is selected such that a plurality of settings of the ISP 107 are optimised a single setting at a time. In another example, the optimisation algorithm optimises the ISP parameters using a line search method, where values for the parameters are sampled across an entire range of values with the search range being iteratively reduced around the minimum of the previous iteration. In a further example, line searches are performed corresponding to a predetermined ISP setting optimisation order. In another example, a plurality of ISP settings are optimised simultaneously. This may be achieved through the selection of grouped parameter values or algorithms which are known from manual optimisation to perform well together. In one example, the parameters P1 and P2 define a linear function and are therefore grouped together for optimisation. In a further example the optimisation algorithm is selected such that different ISP algorithms are chosen for each cycle to find the most beneficial algorithm. In a further example, a Bayesian optimisation method can be used to optimise the ISP parameters.

Although there may be a large number of parameters associated with each sub-module of the ISP 107 slowing the optimisation process, there may be a significant number of parameters which can be fixed at a certain known value, parameterised within a certain range, calculated analytically or tied together in a single parameter. The range of values certain ISP parameters take may be fixed or the degree of accuracy to which the parameter needs to be optimised may be restricted. In one example, there are more ISP parameters than available degrees of freedom, for example, a sub-module contains a parameter which will modulate the values of other parameters associated with different sub-modules of the ISP 107 which are related. In another example, a sub-module contains a look-up table of ISP parameters which are related but are associated with different ISP sub-modules. In a further example, the image processing system 100 is used in conjunction with an application programming interface (API) to allow for the ISP 107 to be automatically optimised to user specifications using a library of gathered test image data 101.

When the feedback loop is interrupted, other test image data 101 may be input into the image processing system 100 and the optimisation process may be repeated. In one example, the ISP 107 is optimised a module at a time using a curated library of test image data 101 for each module until all modules are optimised. The amount of test image data 101 required to optimise a particular sub-module of the ISP 107 is dependent upon the accuracy required by the application. Curated libraries of test image data 101 may have been compiled from previous manual optimisation of an ISP 107.

In one example, the test image data 101 consists of a single or a plurality of task-specific test charts. A test chart or plurality of test charts may be used with or without being processed by the simulator 103. It is difficult to ensure the 1:1 registration of pixels between a test chart and output image data 109. In the example of the comparer 111 being a cost function, the quality metric data, which in this scenario would consist of cost values, becomes difficult to calculate accurately as it is dominated by the difference in the position of the two data sets. A comparer 111 may be selected to produce position independent quality metric data. In one example, the sharpening sub-module 107c of the ISP 107 is optimised through reconstructing the edges of a slanted-edge test chart in output image data 109. The comparer 111 may be configured such that Fourier transforms of the edges on the test chart and the output image data 109 are calculated, with quality metric data consisting of the integral of the absolute difference of the magnitudes of the Fourier transforms. The ISP 107 parameters for the sharpening sub-module 107c may be chosen to minimise this difference. The position of the two images is explicitly excluded by ignoring the phase component of the Fourier transforms with the sharpness sub-module settings forming a symmetric kernel which has zero phase shift.

The image processing system 100 demonstrated in the present example has a number of advantages. The optimisation process for the ISP 107 may be fully automated, removing the need for the expertise and time required to optimise manually. The ISP 107 can be optimised for a number of different sensors, with the simulator 103 avoiding the need for ground truth data allowing for a wide variety of readily available image data to be used for the optimisation process. Different settings of the ISP 107 can be optimised independently by implementing specific settings of the simulator 103, thereby avoiding co-dependence. Known optimisation algorithms previously used for the manual optimisation of ISPs 107 can be readily implemented automatically using the present example. The present example also provides an efficient way to test new optimisation algorithms which may result in the ISP 107 converging to optimum configurations in less cycles or requiring less test image data 101. The image processing system 100 demonstrated here allows for a plurality of test image data 101 to be used in a single feedback loop of the optimisation process and has the flexibility to allow ISPs 107 to be optimised for a number of applications.

Figure 5:
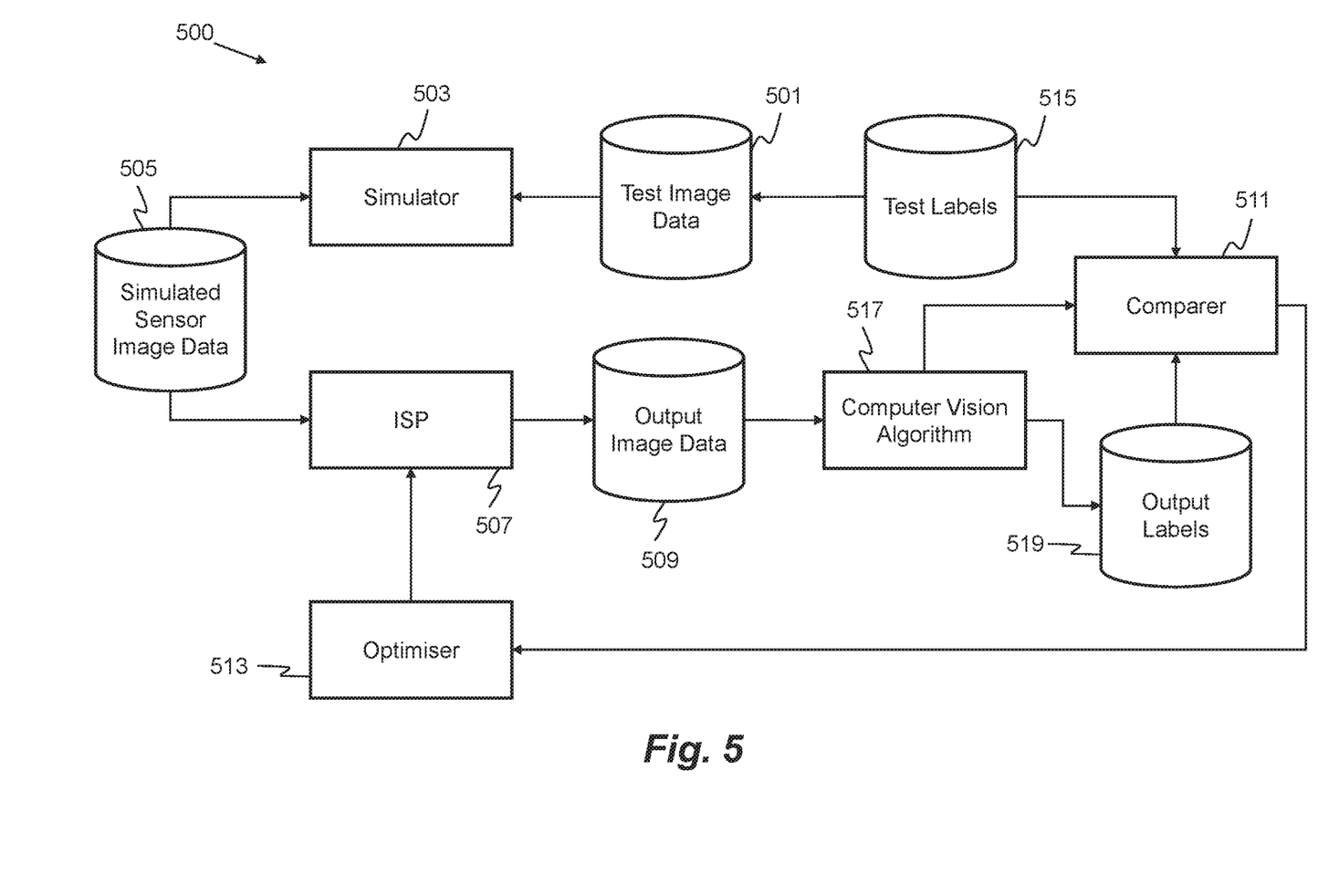
FIG. 5 shows a schematic block diagram demonstrating an image processing system arranged in accordance with a second example of the present disclosure.

FIG. 5 shows a schematic block diagram for an image processing system 500 where an optimiser 513 is used to optimise settings associated with an ISP 507 which processes simulated sensor image data 505 to generate output image data 509, which is input into a CV processor 517 implementing a CV algorithm to generate output labels 519 which are then compared with test labels 515, consistent with a second example of the present disclosure. In the present example, the ISP 507 is optimised to, in turn, optimise the accuracy of the CV processing. The test labels 515, test image data 501, simulated sensor image data 505, output image data 509 and output labels 519 may be stored in memory circuitry such as DRAM or SRAM. The image processing system 500 may receive test image data 501 which has been assigned test labels 515 which may be consistent with classes that a CV algorithm would typically assign. For example, in the case of a CV algorithm designed for automotive use, test image data 501 has a set of test labels 515 assigning objects contained in the image data's scene into classes such as pedestrians, cars, lorries and bikes. The test image data 501 used in the second example may be largely consistent with that used in the first example of an image processing system. The test image data 501 used in this example may contain a scene which a CV processor 517 will assign labels to by analysing the image data.

The test image data 501 is input into a simulator 503 which simulates the physical capture process of a scene contained in the test image data 501 by a sensor. The simulator 503 may be identical, or substantially the same, in functionality to the simulator disclosed in FIG. 2. The simulator 503 may process the test image data 501, producing simulated sensor image data 505 in the same manner as is disclosed in the previous example of an image processing system. The simulated sensor image data 505 is input into the ISP 507 which processes it to produce output image data 509 in the same way as described in the first example of an image processing system. The ISP 507 may be identical or substantially the same, in functionality to the ISP disclosed in FIG. 3. The output image data 509 is then input into a CV processor 517 which uses the output image data 509 to infer output labels 519. In one example, the CV processor 517 implements a classification neural network which takes the output image data 509 as its input, inferring class probabilities based on the image data and using these to produce output labels 519. In another example the CV processor 517 implements a convolutional neural network (CNN). The CV processor 517 may be trained with a comparer 511. This comparer 511 then produces quality metric data. In one example, the comparer 511 implements a cost function which can be used to measure the quality of the class inferences generated in the output labels 519 when compared to the test labels 515. In one example the cost function produces a cost to indicate the difference between the test labels 515 and output labels 519. As with the first example of the image processing system, different test image data 501 each with accompanying test labels 515 can be used to generate a number of quality metric values which can be used to form quality metric data.

The quality metric data is used by an optimiser 513, which may be identical, or substantially the same, in functionality to the optimiser disclosed in the first example of an image processing system. The optimiser 513 optimises the settings of the ISP 507. The optimiser 513 may be configured to change parameters and algorithms associated with ISP 507 sub-modules to minimise the difference between the output labels 519 and test labels 515. The ISP 507, CV algorithm 517, comparer 511 and optimiser 513 may be arranged in a closed feedback loop. A cycle of the closed feedback loop includes processing the simulated sensor image data 505 with the ISP 507 to generate the output image data 509, which is then input into the CV algorithm 517 producing output labels 519 which are compared with the test labels 515 using the comparer 511 to produce quality metric data. These steps may be repeated with different test image data 501 with associated test labels 515 in order to produce a plurality of quality metric values which form quality metric data. At the end of a cycle of the feedback loop, quality metric data is used to update the ISP 507 settings. The next cycle begins when the updated ISP 507 is used to process simulated sensor image data 505. The cycles continue until the difference between the output labels 519 and test labels 515 is minimised to a threshold value as measured by the quality metric data, at which point the optimisation process is terminated. In this way, the settings of the ISP 507 are optimised to, in turn, optimise the accuracy of the CV algorithm 517.

The optimiser 513 may have an associated optimisation algorithm which may be identical, or substantially the same, in functionality to the optimisation algorithm described in the first example of an image processing system. In one example, the optimisation algorithm is selected to ensure that the plurality of the ISP settings are optimised a single setting at a time. In another example, the optimisation algorithm optimises the ISP 507 parameters using a line search method. In one example, when the ISP 507 has been suitably optimised using one piece of test image data 501, the process is repeated using different test image data 501. As in the first example of an image processing system, the ISP 507 may be optimised a sub-module at a time using a curated library of test image data 501. The image processing system 500 may use test image data 501 with accompanying test labels 515 taken from a training set to optimise the ISP 507. A training set of test image data 501 may be retrieved from a large online dataset depository via a network connection and stored in memory circuitry in the image processing system.

Figure 6A:
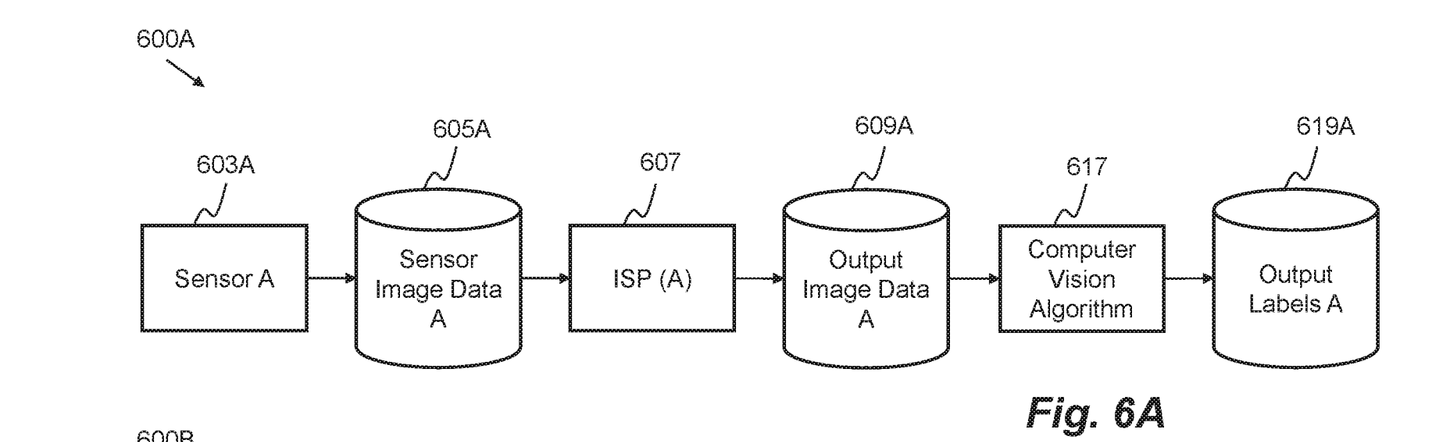
FIG. 6 shows a schematic block diagram demonstrating two computer vision systems with different sensors.
Figure 6B:
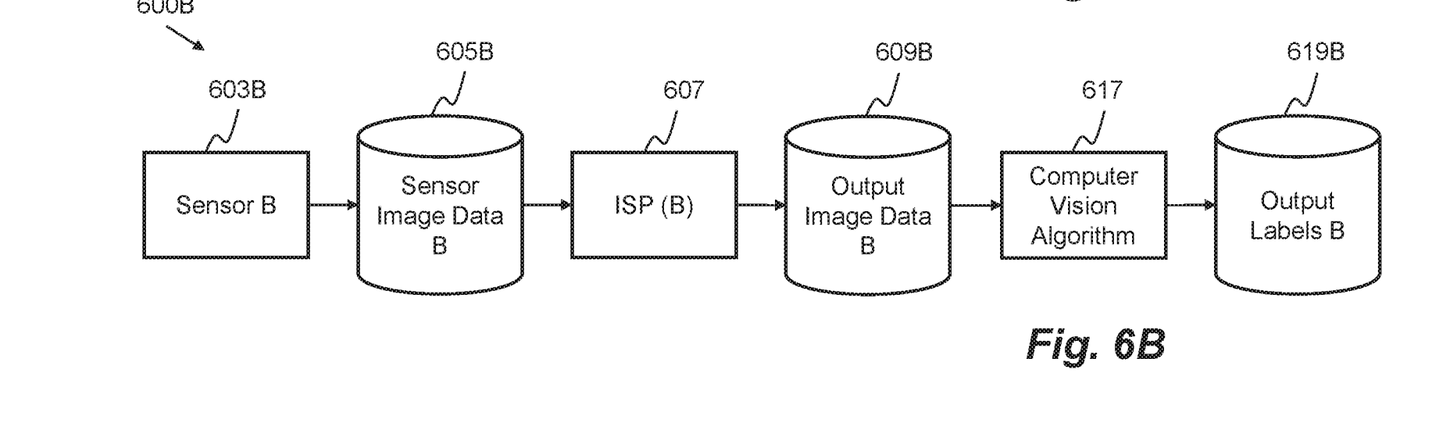

The image processing system 500 has particular importance with regards to optimising an ISP 507 for a CV system in an adaptable way to accommodate a change in sensor type. FIG. 6 shows a schematic block diagram demonstrating two CV systems 600A and 600B. Each has a sensor 603A and 603B which generates corresponding sensor image data 605A and 605B. These sensor image data sets are processed by an ISP 607. For each CV system, the ISP 607 has been optimised for its respective sensor 601A or 601B. The sensor image data 605A and 605B in each CV system is processed by the ISP 607 to produce output image data sets 609A and 609B. Each set may be input into an identical, or similar, CV processor 617 to produce corresponding output labels 619A and 619B. Different types of sensors 603A and 603B will often produce different sensor image data 605A and 605B even when capturing the same scene. The image processing system 500 may be used to ensure that the ISP 607 in each case is optimised for each sensor 601A and 601B and is therefore able to produce output labels 619A and 619B which are the same or appropriately close even for the different sensors 603A and 603B. The image processing system 500 is able to ensure that the output labels 619A produced by the CV processor 617 will continue to be accurate even if a sensor is changed in a CV system after re-optimisation of the ISP 607 for that particular sensor.

In one example, the ISP settings are initially chosen to match the settings of a previously optimised ISP to process sensor image data from a first sensor. The ISP with previously optimised settings may then be used to process sensor image data from a second sensor. These initial settings based on the optimisation of the ISP for the first sensor may be used as a starting point for the optimisation of the ISP settings for processing sensor image data from the second sensor. The initial ISP settings may be selected by a user using a computer which is connected to the ISP via a network connection. In another example, the optimisation process of optimising the ISP settings for processing sensor image data from a first sensor are utilised to optimise ISP settings to process sensor image data from a second sensor. The optimisation process may be based on the ISP parameters and algorithms as well as optimiser optimisation algorithms.

The image processing system 500 demonstrated in the second example has a number of advantages. The ISP 507 can be considered an extension of the CV processor 517 in that it is explicitly trained with predetermined algorithms. The optimisation process of the ISP 507 and in turn optimising the accuracy of the CV processor 517 may be fully automated, avoiding the need for a manual optimisation process. Automatic optimisation is computationally efficient than manual optimisation as there is a systematised routine for optimising CV accuracy one ISP 507 setting at a time. The ISP 507 and corresponding CV algorithm 517 can be optimised for a number of different sensors, without the need for ground truth data. This can be achieved by using a simulator 503 allowing for a wide variety of readily available training sets of labelled images to be utilised to optimise the ISP 507, in turn optimising the accuracy of the CV processor 517. An image processing system 500 with a well optimised ISP may reduce the requirements on the size and complexity of the CV algorithm 517 required to process the output image data and produce output labels of suitable accuracy. In the case of a convolutional neural network, the optimised ISP may reduce the number of layers required.

Figure 7:
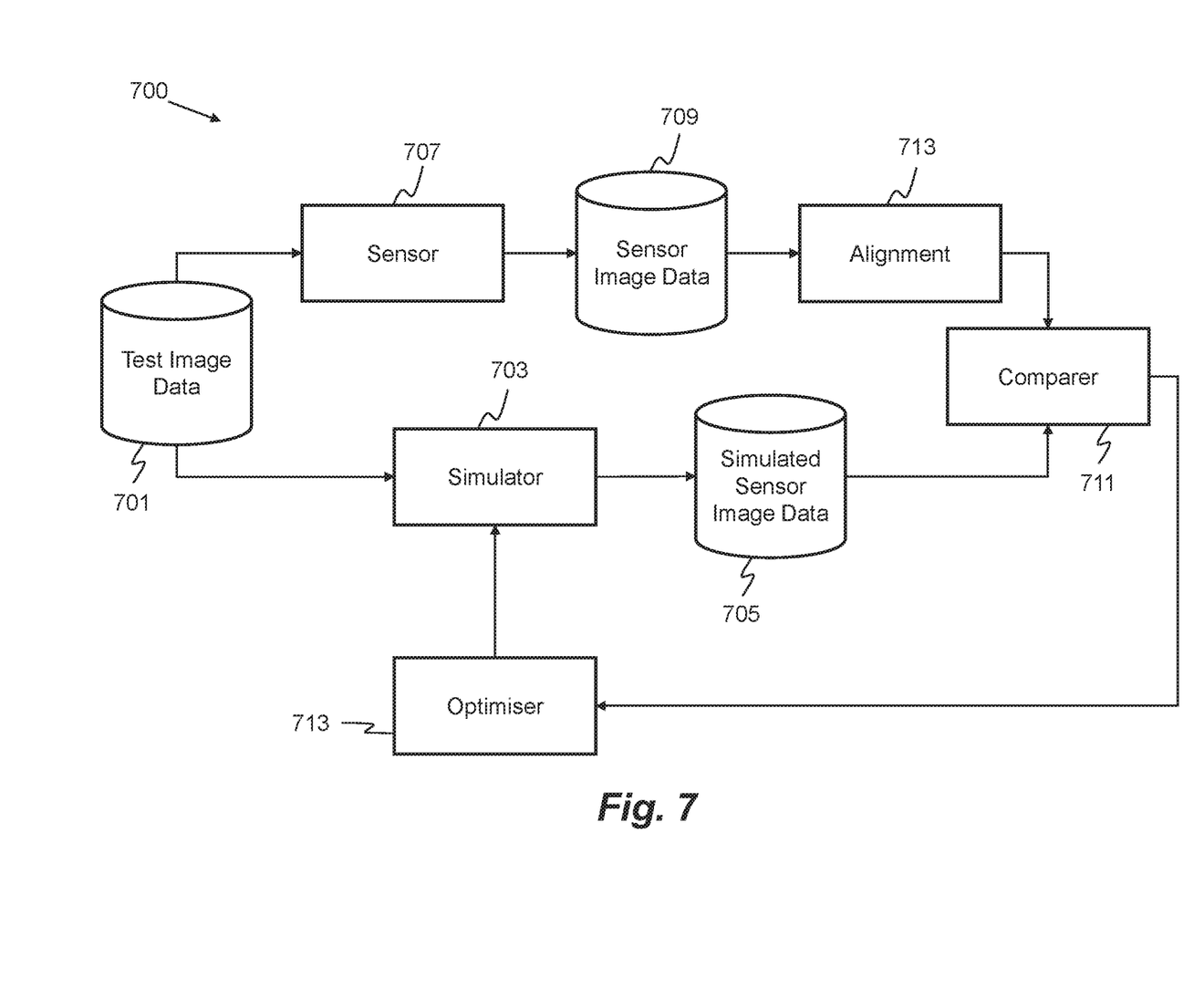
FIG. 7 shows a schematic block diagram demonstrating an image processing system arranged in accordance with a third example of the present disclosure.

FIG. 7 shows a schematic block diagram for an image processing system 700 where an optimiser 713 is used to optimise settings associated with a simulator 703, consistent with a third example of the present disclosure. In this configuration the non-stochastic physical attributes of a sensor 707 can be found by optimising the simulator 703 to produce simulated sensor image data 705 which matches sensor image data 709 generated by the sensor 707. The test image data 701, simulated sensor image data 705 and sensor image data 709 may be stored in memory circuitry such as DRAM or SRAM.

A sensor 707 is used to capture a scene which is contained in test image data 701, producing sensor image data 709. The sensor 707 detects the intensity of light coming from the scene at various pixels or points on the sensor, generating sensor image data 709 based on this physical process and the properties of the sensor. The sensor 707 may be a digital camera. The sensor image data 709 may consist of a matrix of values, with each value representing the intensity of light of a pixel. The sensor 707 producing the sensor image data 709 may have properties associated with the sub-modules of the simulator 703 such as lens shading, blur, chromatic aberration, mosaicking, colour response, noise and black level. In one example, the sensor image data 709 is consistent with being produced by a sensor 707 with a Bayer filter. The test image data 701 containing the scene captured by the sensor 707 is processed by a simulator 703. The simulator 703 may be identical, or substantially the same, in functionality to the simulator disclosed in FIG. 2. The test image data 701 may be processed by the simulator 703, in the same way that is detailed in the earlier examples of this disclosure, to generate simulated sensor image data 705.

In one example, the sensor image data 709 undergoes an alignment process 713 to ensure 1:1 registration between the pixels of the sensor image data 709 and simulated sensor image data 705. This alignment process 713 may implement a function which is used to process the sensor image data 709. In another example, the simulated sensor image data 705 undergoes the alignment process 713 instead of the sensor image data 709. The simulated sensor image data 705 and sensor image data 709 are then compared using a comparer 711 producing quality metric data. In one example, different test image data 701 is used to produce a plurality of quality metric values which form quality metric data. The quality metric data may be input into an optimiser 713 which optimises the settings of the simulator 703. This may be done by changing the simulator settings associated with different sub-modules. In one example, the quality metric data consists of cost values produced by a comparer 711 which is a cost function. These cost values may be minimised by the change in settings of the simulator 703. The simulator 703, comparer 711 and optimiser 713 are arranged in a feedback loop which operates in the same way as discussed in previous examples. A cycle of the closed feedback loop includes processing the test image data 701 with the simulator 703 to generate the simulated sensor image data 705, which is then compared with the sensor image data 709 using the comparer 711. These steps may be repeated with different test image data 701 to produce quality metric values which form quality metric data. It should be noted that for the image processing system in this example, the sensor 707 may also capture the scenes contained in the different test image data 701 to produce sensor image data 709 to be input to the comparer 711 to produce quality metric values. An alignment process 713 may also occur during these steps. At the end of a cycle of a feedback loop the quality metric data may be used to update simulator settings using the optimiser 713. The next cycle of the feedback loop begins when the updated simulator 703 is used to process test image data 701. The cycles of the feedback loop may be continued until the simulator settings are optimised such that the difference between the simulated sensor image data 705 when compared to the sensor image data 709 is below a chosen threshold. At this point the optimisation process is terminated.

The optimisation algorithm for the optimiser 713 may be the same as described in previous examples. In one example, the simulator settings associated with each sub-module are optimised one at a time or grouped together into related simulator settings and optimised. In another example, the simulator settings are optimised using a linear search method or a Bayesian optimisation method. The optimisation process ensures that the simulator settings and the properties of the sensor 707 converge, allowing the image processing system 700 to characterise the sensor 707.

After characterising a sensor 707, the simulator settings associated with it may be entered into previous examples of the disclosure via the use of the simulator 703 using an API, allowing for an ISP to be optimised to process sensor image data 709 from that type of sensor 707. This means that the ISP can be optimised to process sensor image data 709 produced by a sensor 707 where the non-stochastic physical attributes of the capture process are unknown, producing output image data that can be utilised by CV algorithms. This information can also be used to ensure that the ISP can process sensor image data produced by different sensors to generate accurate CV algorithm output labels.

The above embodiments are to be understood as illustrative examples. Further embodiments are envisaged. It is to be understood that any feature described in relation to any one example may be used alone, or in combination with other features described, and may also be used in combination with one or more features of any other of the embodiments, or any combination of any other of the examples. Furthermore, equivalents and modifications not described above may also be employed without departing from the scope of the invention, which is defined in the accompanying claims.

What is claimed is:

1. A method of optimising an image signal processor (ISP), which is to be used to process sensor image data generating output image data, the method comprising:
receiving test image data,
processing the test image data using a simulator to generate simulated sensor image data, wherein the simulator simulates a physical capture process of a scene by a sensor;
processing the simulated sensor image data according to one or more ISP settings to produce output image data;
producing quality metric data associated with the output image data by performing a comparison between the output image data and the test image data; and
optimising the one or more ISP settings based on the quality metric data.

2. The method of claim 1, wherein the method comprises:
inputting the output image data into a computer vision algorithm;
processing the output image data using the computer vision algorithm to generate one or more output labels; and
comparing test labels associated with the test image data to the output labels.

3. The method of claim 2, wherein the method comprises processing the output image data using a classification neural network.

4. The method of claim 1, wherein the method comprises optimising a plurality of the ISP settings using at least one of:
a single setting at a time; and
a group of related settings at a time.

5. The method of claim 1, wherein the method comprises optimising one or more ISP parameters using at least one of:
a line search; and
a Bayesian optimisation method.

6. A method of optimising a simulator, which is to be used to process test image data to generate simulated sensor image data, the method comprising:
receiving test image data consistent with a scene;
processing the test image data according to one or more simulator settings to produce simulated sensor image data, wherein the simulator simulates a physical capture process of a scene by a sensor;
capturing the scene using the sensor to produce sensor image data;
performing a comparison between the simulated sensor image data and sensor image data;
producing quality metric data associated with the comparison; and
optimising one or more simulator settings based on the quality metric data.

7. The method of claim 6, wherein the method comprises optimising a plurality of the simulator settings using at least one of:
a single setting at a time; and
a group of related settings at a time.

8. The method of claim 6, wherein the method comprises optimising the one or more simulator settings using at least one of:
a line search method; and
a Bayesian optimisation method.

9. The method of claim 6, wherein the method comprises at least one of:
performing an alignment between the simulated sensor image data and sensor image data; or
performing the comparison using a cost function, and determining a cost associated with the cost function.

10. An image processing system comprising:
memory circuitry arranged to store test image data, one or more settings associated with an ISP and output image data; and
processing circuitry configured to:
receive test image data;
process the test image data using a simulator to generate simulated sensor image data, wherein the simulator simulates a physical capture process of a scene by a sensor;
process the simulated sensor image data according to one or more ISP settings to produce output image data;

produce a quality metric associated with the output image data by performing a comparison between the output image data and the test image data; and optimise one or more settings associated with the ISP based on the quality metric.

11. The system of claim 10, wherein the processing circuitry is arranged to:

input the output image data into a computer vision algorithm;

process the output image data using the computer vision algorithm to generate one or more output labels; and compare test labels associated with the test image data to the output labels.

12. An image processing system comprising:

memory circuitry arranged to store test image data, one or more settings associated with a simulator, simulated sensor image data and sensor image data; and processing circuitry configured to:

receive test image data consistent with a scene;

process the test image data according to one or more simulator settings to produce simulated sensor image data, wherein the simulator simulates a physical capture process of a scene by a sensor;

capture the scene using the sensor to produce sensor image data;

perform a comparison between the simulated sensor image data and sensor image data;

produce quality metric data associated with the comparison; and optimise one or more simulator settings based on the quality metric data.

13. The system of claim 12, wherein the processing circuitry is arranged to optimise at least one of:

a plurality of the simulator settings using at least one of a single setting at a time, or a group of related settings at a time; or the one or more simulator settings using at least one of a line search method, or a Bayesian optimisation method.

14. The system of claim 12, wherein the processing circuitry is arranged to at least one of:

perform an alignment between the simulated sensor image data and sensor image data; or perform the comparison using a cost function, and determine a cost associated with the cost function.

15. A non-transitory computer readable storage medium comprising instructions which, when executed by a computer, cause the computer to:

receive test image data, process the test image data using a simulator to generate simulated sensor image data, wherein the simulator simulates a physical capture process of a scene by a sensor;

process the simulated sensor image data according to one or more ISP settings to produce output image data;

produce quality metric data associated with the output image data by performing a comparison between the output image data and the test image data; and optimise the one or more ISP settings based on the quality metric data.

16. A non-transitory computer readable storage medium comprising instructions which, when executed by a computer, cause the computer to:

receive test image data consistent with a scene;

process the test image data according to one or more simulator settings to produce simulated sensor image data, wherein the simulator simulates a physical capture process of a scene by a sensor;

capture the scene using the sensor to produce sensor image data;

perform a comparison between the simulated sensor image data and sensor image data;

produce quality metric data associated with the comparison; and optimise one or more simulator settings based on the quality metric data.

* * * * *